(12) United States Patent
Miyauchi et al.

(10) Patent No.: US 9,203,197 B2
(45) Date of Patent: Dec. 1, 2015

(54) ELECTRICAL DEVICE CONNECTOR

(71) Applicant: Kabushiki Kaisha Toshiba, Tokyo (JP)

(72) Inventors: Yasuhisa Miyauchi, Tokyo (JP); Jun Matsuzaki, Tokyo (JP); Osamu Tagaya, Tokyo (JP); Kohei Yasuda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/503,638

(22) Filed: Oct. 1, 2014

(65) Prior Publication Data
US 2015/0099403 A1    Apr. 9, 2015

(30) Foreign Application Priority Data

Oct. 8, 2013    (JP) .................... 2013-210661

(51) Int. Cl.
| | |
|---|---|
| H01R 24/76 | (2011.01) |
| H01R 24/54 | (2011.01) |
| H01R 13/187 | (2006.01) |
| H01R 13/24 | (2006.01) |
| H01R 101/00 | (2006.01) |

(52) U.S. Cl.
CPC ............ *H01R 24/542* (2013.01); *H01R 13/187* (2013.01); *H01R 13/2421* (2013.01); *H01R 2101/00* (2013.01)

(58) Field of Classification Search
CPC .................................................. H01R 24/542
See application file for complete search history.

(56) References Cited

U.S. PATENT DOCUMENTS

| | | | |
|---|---|---|---|
| 3,086,190 A | 4/1963 | Neidecker et al. | |
| 3,912,352 A | 10/1975 | Kinnear | |
| 4,925,403 A | 5/1990 | Zorzy | |
| 5,401,175 A * | 3/1995 | Guimond et al. | ............... 439/38 |
| 5,879,177 A * | 3/1999 | Honma | ........................ 439/246 |
| 8,801,459 B2 * | 8/2014 | Mrowka | ....................... 439/578 |

(Continued)

FOREIGN PATENT DOCUMENTS

| | | |
|---|---|---|
| CH | 323737 A | 8/1957 |
| EP | 1339145 A1 | 8/2003 |
| JP | 2005-027407 A | 1/2005 |

(Continued)

OTHER PUBLICATIONS

Extended European Search Report issued in related European Patent Application No. 14186358.9 mailed Mar. 2, 2015, 6 pages.

*Primary Examiner* — James Harvey
(74) *Attorney, Agent, or Firm* — Baker Botts L.L.P.

(57) ABSTRACT

The electrical device connector is characterized by including: a first central conductor in which a first concave portion is provided; a first insulation layer provided around the first central conductor; a second central conductor in which a second concave portion is provided; a second insulation layer provided around the second central conductor; a flexible insulator provided between the first insulation layer and the second insulation layer; and a barrel-shaped contact provided in a space portion formed by the first concave portion and the second concave portion, wherein the barrel-shaped contact is configured to include: a center electrode; a plurality of contact pieces including one contact surface coming in contact with an inner surface of the first concave portion and the other contact surface coming in contact with an inner surface of the second concave portion, across an intermediate portion as a boundary; and contact load springs provided between the contact piece and the center electrode.

5 Claims, 6 Drawing Sheets

(56) References Cited

U.S. PATENT DOCUMENTS

2004/0038586 A1* 2/2004 Hall et al. .................. 439/578
2015/0099403 A1* 4/2015 Miyauchi et al. ............ 439/729

FOREIGN PATENT DOCUMENTS

| JP | 2008-228467 A | 9/2008 |
| WO | 2011/015992 A1 | 2/2011 |

* cited by examiner

ELECTRICAL DEVICE CONNECTOR

CROSS-REFERENCE TO RELATED APPLICATION

This application claims benefit of priority from Japanese Application No. JP 2013-210661 filed Oct. 8, 2013, the entire contents of which are incorporated by reference herein.

FIELD

Embodiments of the present invention relates to an electrical device connector that is used to connect solid-insulated electrical devices molded with an insulating material to each other.

BACKGROUND

Conventionally, or in the related art, electrical devices such as vacuum valves or main circuit conductors molded with an epoxy resin are connected to each other using an interface connection through a flexible insulator. An insulation surface of an interface connection portion has a tapered shape (for example, see Patent Literature 1), a disc shape (for example, see Patent Literature 2) or the like, but the main circuit conductors are connected in such a manner that an end surface of one conductor is provided with a concave portion and the other conductor is inserted into the concave portion.

Further, these Patent Literatures 1 and 2 correspond to JP 2008-228467 A (hereinafter, referred to as Patent Literature 1) and JP 2005-27407 A (hereinafter, referred to as Patent Literature 2), respectively.

As illustrated in FIG. 6, a connection device of this type is configured to include a first electrical device 1a and a second electrical device 1b.

A rod-shaped first central conductor 2 is provided in the first electrical device 1a. A first insulation layer 3 is formed by molding an epoxy resin and is provided around the first central conductor 2 to act as a flange portion of which an end is expanded in a radial direction. An end of the first central conductor 2 is exposed at an insulation surface of the flange portion. A first grounding layer 4 coated with a conductive coating material is provided on an outer periphery of the first insulation layer 3.

The second electrical device 1b is provided with a second central conductor 6 having a concave portion 5 into which the exposed first central conductor 2 is inserted. A second insulation layer 7 is formed by molding an epoxy resin as in the first insulation layer 3 and is provided around the second central conductor 6 to act as a flange portion of which an end is expanded in a radial direction. A second grounding layer 8 is coated with a conductive coating material as in the first grounding layer (4) and is provided on an outer periphery of the second insulation layer 7. A spring-like ring contact (or contact shoe, hereinafter called contact) 9 is provided on an inner surface of the concave portion 5, and an outer periphery surface of the first central conductor 2 comes in contact with the ring contract.

A disc-like flexible insulator 10 made of silicon rubber, EP rubber or the like is provided between an insulation surface of the first insulation layer 3 and an insulation surface of the second insulation layer 7. The flange portion of the first insulation layer 3 is tightly fixed to the flange portion of the second insulation layer 7 with a bolt (not illustrated), and thus a predetermined surface pressure is applied to the flexible insulator 10.

In this connector, a central axis of the first central conductor 2 has to be matched with that of the concave portion 5 during connection. When the central axes deviate from each other, a contact pressure of the contact (contact shoe) 9 varies in a circumferential direction and contact resistance rises. For this reason, in the first electrical device 1a or the second electrical device 1b, dimensional accuracy was strictly managed at each stage, for example, at a component level, at the time of manufacturing, or at the time of assembling.

An object of the present invention is to provide an electrical device connector in which deviation of central axes can be allowed within a predetermined range when a first electrical device 1a and a second electrical device 1b are connected to each other and thus dimensional accuracy can be easily managed at each stage, for example, at a component level, at the time of manufacturing, or at the time of assembling.

In order to solve the above problems, an electrical device connector according to embodiments is characterized by including: a first central conductor in which a first concave portion is provided at an end surface thereof; a first insulation layer provided around the first central conductor; a second central conductor in which a second concave portion is provided at an end surface thereof; a second insulation layer provided around the second central conductor; a flexible insulator provided between an insulation end surface of the first insulation layer and an insulation end surface of the second insulation layer; and a barrel-shaped contact provided in a space portion formed by the first concave portion and the second concave portion, wherein the barrel-shaped contact is configured to include: a center electrode; a plurality of contact pieces radially disposed on an outer periphery of the center electrode and including one contact surface coming in contact with an inner surface of the first concave portion and the other contact surface coming in contact with an inner surface of the second concave portion, across an intermediate portion as a boundary; and contact load springs provided between the contact piece and the center electrode.

DETAILED DESCRIPTION OF THE PREFERRED EMBODIMENTS

Hereinafter, embodiments of the present invention will be described with reference to the drawings.

First Embodiment

Figure 1:
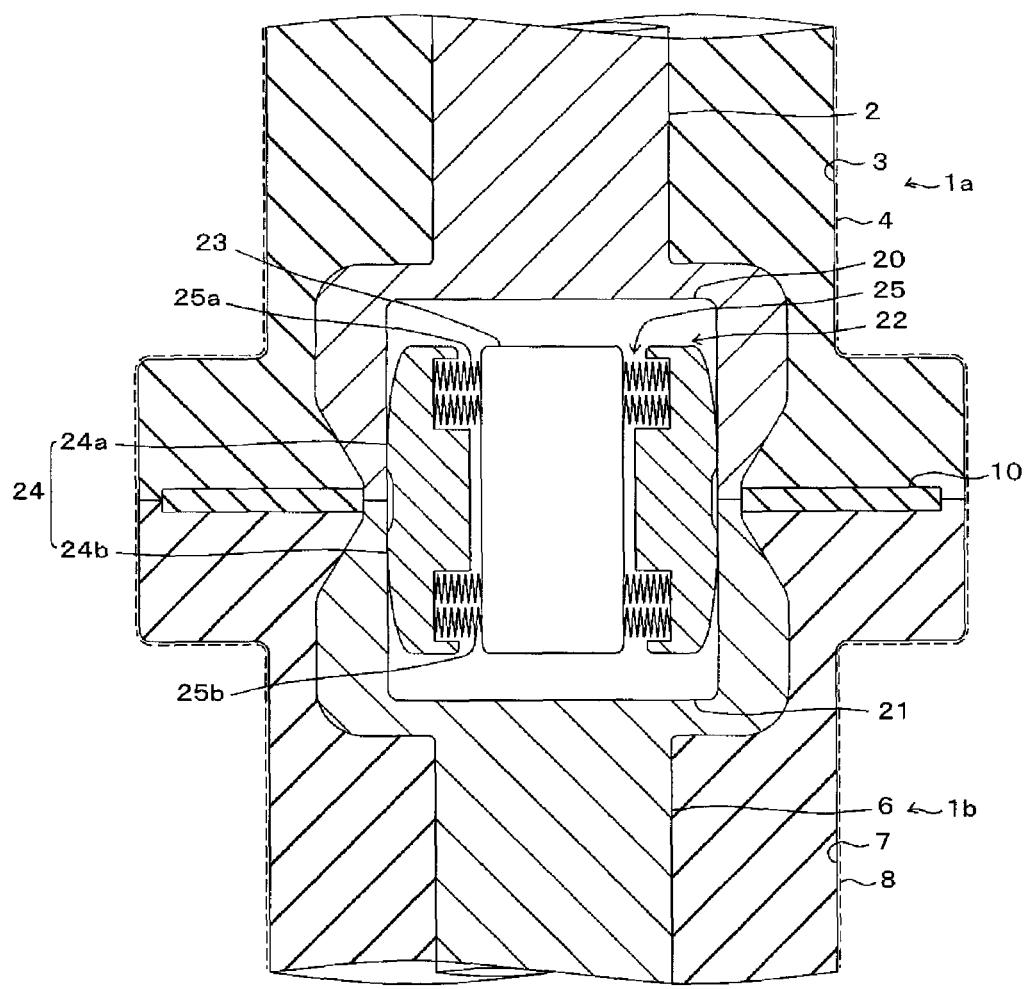
FIG. 1 is a cross-sectional view illustrating a configuration of an electrical device connector according to a first embodiment of the present invention.
Figure 2:
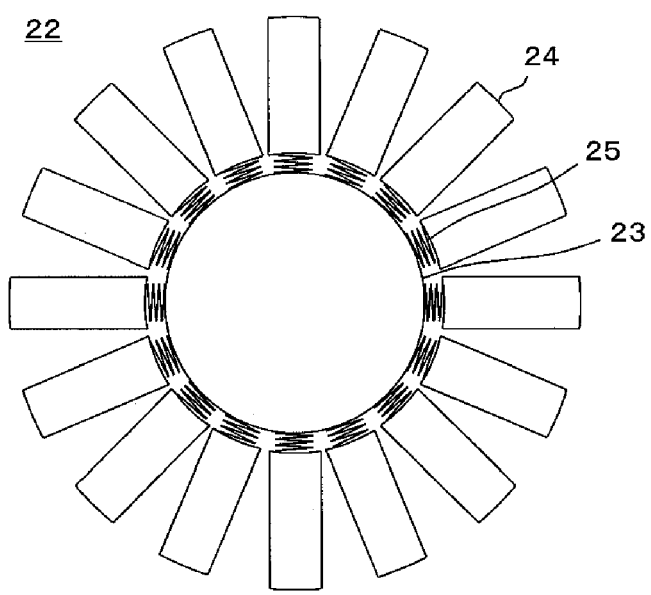
FIG. 2 is a top view illustrating a configuration of a barrel-shaped contact (or contact shoe) according to the first embodiment of the present invention.
Figure 3:
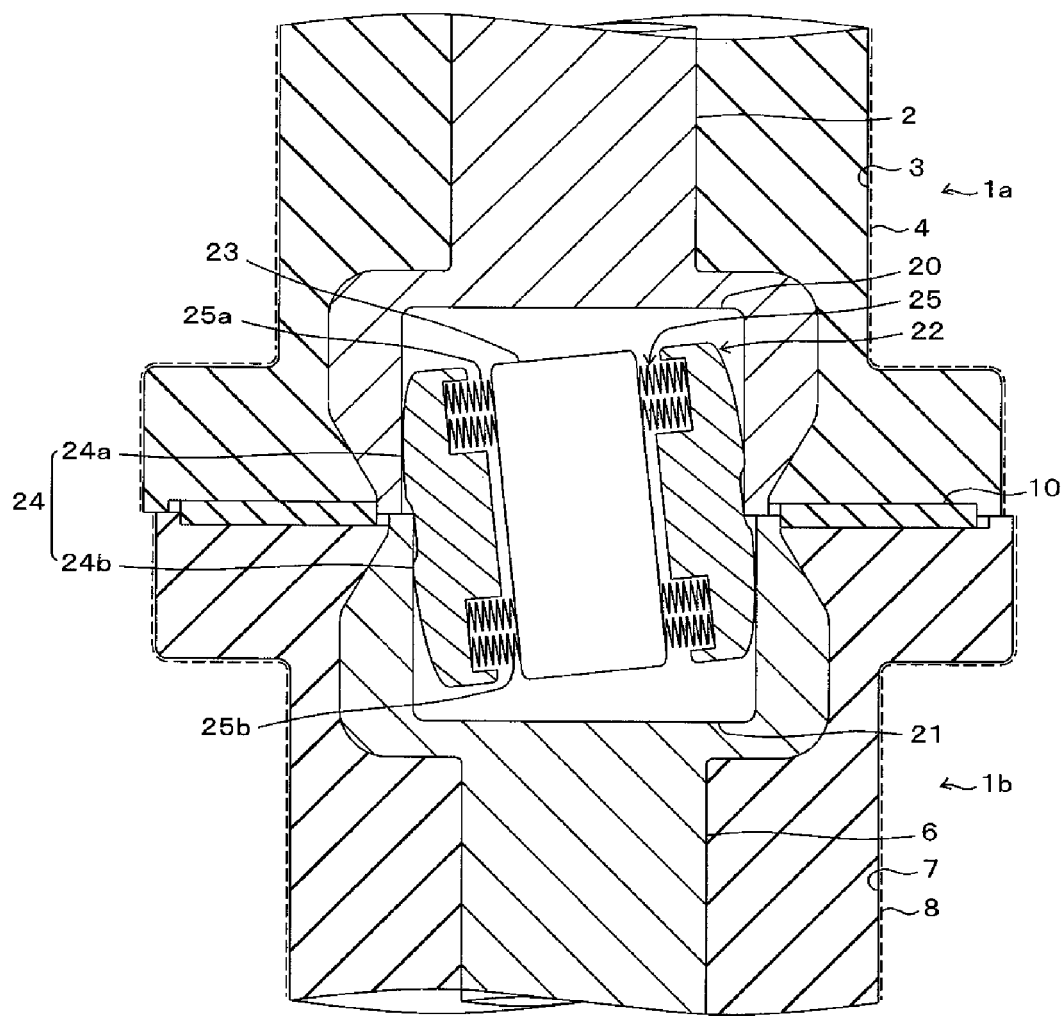
FIG. 3 is a cross-sectional view illustrating an example of a connection of the electrical device connector according to the first embodiment of the present invention.

At first, an electrical device connector according to a first embodiment of the present invention will be described with reference to FIGS. 1 to 3. FIG. 1 is a cross-sectional view illustrating a configuration of the electrical device connector according to the first embodiment of the present invention; FIG. 2 is a top view illustrating a configuration of a barrel-shaped contact according to the first embodiment of the present invention; and FIG. 3 is a cross-sectional view illustrating an example of a connection of the electrical device connector according to the first embodiment of the present invention.

Further, the same components as in the related art will be denoted by the same reference numerals.

As illustrated in FIG. 1, the electrical device connector is configured to include a first electrical device 1a and a second electrical device 1b.

The first electrical device 1a is provided with a first central conductor 2 having a first concave portion 20 of which an end surface is recessed in a circular shape. A first insulation layer 3 is formed by molding an epoxy resin and is provided around the first central conductor 2 to act as a flange portion of which an end is expanded in a radial direction. An inner surface of the first concave portion 20 is exposed. A first grounding layer 4 is coated with a conductive coating material and is provided on an outer periphery of the first insulation layer 3.

The second electrical device 1b is provided with a second central conductor 6 having a second concave portion 21 of which an end surface is recessed in a circular shape. The second concave portion 21 and the first concave portion 20 have the same shape and face each other at the time of the connection. A second insulation layer 7 is formed by molding an epoxy resin as in the first insulation layer 3 and is provided around the second central conductor 6 to act as a flange portion of which an end is expanded in a radial direction. An inner surface of the second concave portion 21 is exposed. A second grounding layer 8 is coated with a conductive coating material as in the first grounding layer 4 and is provided on an outer periphery of the second insulation layer 7.

A space portion is formed by the first concave portion 20 and the second concave portion 21 and is provided with a barrel-shaped contact 22. As illustrated in FIG. 2, the barrel-shaped contact 22 is configured to include a columnar center electrode 23 provided at the center, a plurality of contact pieces 24 provided radially on an outer periphery of the center electrode 23, and a contact load spring 25 which is provided between the outside of the center electrode 23 and the inside of the contact pieces 24 and is biased to push the contact piece 24 out in an outward direction. The outside of the contact piece 24 is provided with contact surfaces 24a and 24b in which both ends of one contact surface and the other contact surface are protruded in an arc shape across an intermediate portion as a boundary. One contact surface 24a comes in contact with the inner surface of the first concave portion 20, and the other contact surface 24b comes in contact with the inner surface of the second concave portion 21. The contact load spring 25 is provided at both ends of the contact piece 24, and one contact load spring 25a and the other contact load spring 25b are provided on one contact surface 24a and the other contact surface 24b, respectively, so as to face each other. Further, the intermediate portion of the contact piece 24 is provided with a plurality of bands (not illustrated), and the plurality of bands are positioned radially on the outer periphery of the center electrode 23.

A disc-like flexible insulator 10 made of silicon rubber, EP rubber or the like is provided between an insulation end surface (planar interface connection portion) of the first insulation layer 3 and an insulation end surface (planar interface connection portion) of the second insulation layer 7. The flange portion of the first insulation layer 3 is tightly fixed to the flange portion of the second insulation layer 7 with a bolt (not illustrated), and thus a predetermined surface pressure is applied to the flexible insulator 10.

Next, a case where central axes of the first electrical device 1a and the second electrical device 1b deviate from each other will be described with reference to FIG. 3. The deviation of the central axis is exaggeratingly illustrated, but the deviation of general manufacturing tolerance or more can be covered.

As illustrated in FIG. 3, when the axes of the first central conductor 2 and the second central conductor 6 deviate from each other, the barrel-shaped contact 22 also becomes eccentric by following the deviation. In this case, the contact piece 24 and the center electrode 23 become eccentric such that the same load is applied to one contact surface 24a and the other contact surface 24b by the contact load springs 25a and 25b. That is to say, the center electrode 23 and the contact piece 24 can eccentrically move, and thus one contact load spring 25a and the other contact load spring 25b maintain the same spring force.

Further, even when the contact load spring 25 is solely provided at the intermediate portion of the contact piece 24, it can apply a load to one contact surface 24a and the other contact surface 24b. In terms of insulation properties (characteristics), furthermore, since the insulation end surfaces of the first and second insulation layers 3 and 7 are smooth surfaces and the flexible insulator 10 has the disc shape, it is possible to maintain a predetermined surface pressure even when the central axes deviate from each other. For this reason, the deviation of the central axis of the first central conductor 2 from the central axis of the second central conductor 6 can be allowed, and dimensional accuracy can be easily managed at each stage, for example, at a component level, at the time of manufacturing, or at the time of assembling.

According to the electrical device connector of the first embodiment described above, the barrel-shaped contact 22, which is freely eccentric, is provided in the space portion formed by the concave portion 20 of the first central conductor 2 and the concave portion 21 of the second central conductor 6. Thus, even when the central axes of the first central conductor 2 and the second central conductor 6 deviate from each other, using the contact load spring 25, one contact surface 24a can apply a predetermined contact load to the inner surface of the first concave portion 20 and the other contact surface 24b can apply a predetermined contact load to the inner surface of the second concave portion 21 such that satisfactory contact resistance can be maintained. In addition, the flexible insulator 10 can be maintained at a predetermined surface pressure, thereby obtaining satisfactory insulation properties.

Second Embodiment

Figure 4:
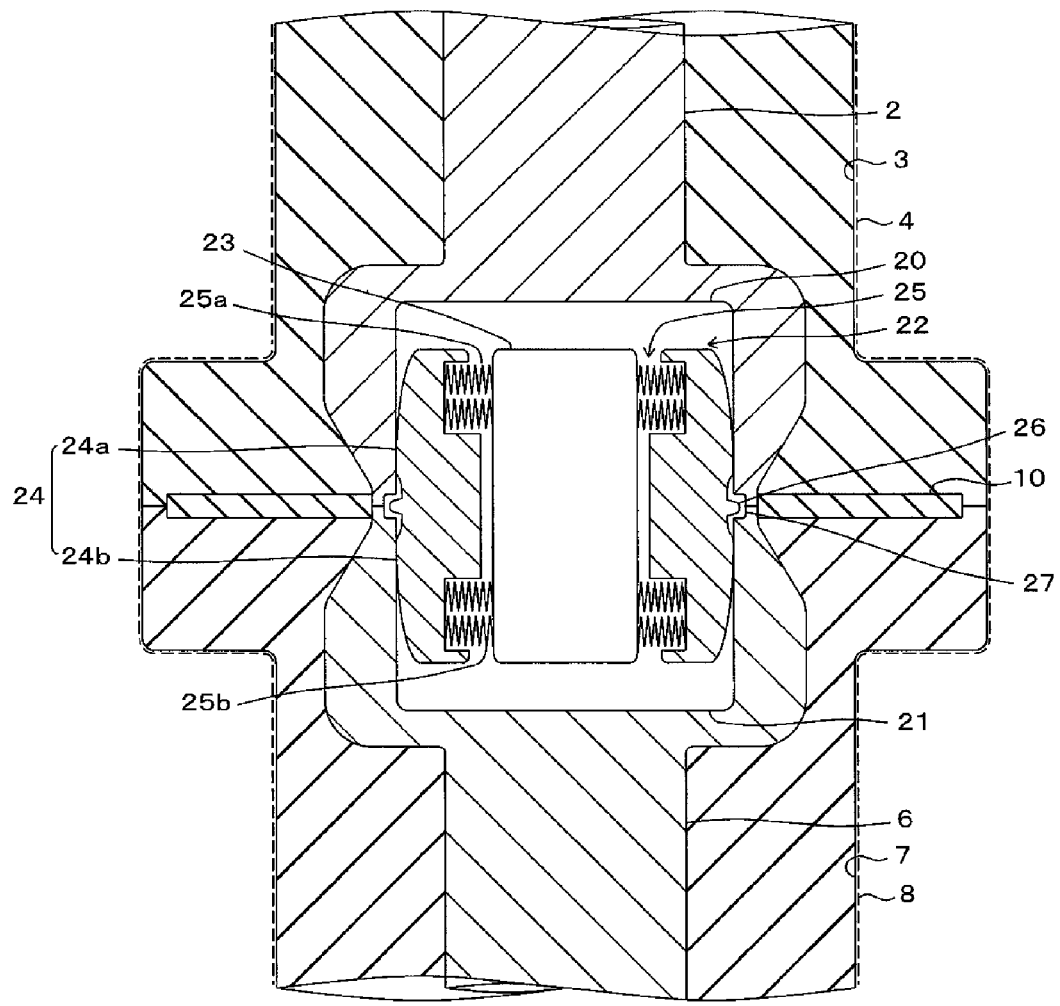
FIG. 4 is a cross-sectional view illustrating a configuration of an electrical device connector according to a second embodiment of the present invention.

Next, an electrical device connector according to a second embodiment of the present invention will be described with reference to FIG. 4. FIG. 4 is a cross-sectional view illustrating a configuration of the electrical device connector according to the second embodiment of the present invention. Further, the second embodiment is similar to the first embodiment except that a convex portion is provided at the intermediate portion of the contact piece. In FIG. 4, the same components as in the first embodiment will be denoted by the same reference numerals and the detailed description thereof will not be presented.

As illustrated in FIG. 4, a convex portion 26 is provided on the outside of the intermediate portion of a contact piece 24, and ends of the first and second concave portions 20 and 21 are provided with a groove portion 27 to which the convex portion 26 is loosely fitted. It is assumed that the groove portion 27 is provided on at least one end and the convex portion 26 has a width and a depth in which a movement is feasible along with eccentricity.

According to the electrical device connector of the second embodiment described above, in addition to the effect (benefit) of the first embodiment, the barrel-shaped contact 22 may not be inserted into the back over the groove portion 27 at the time of assembling, thereby easily performing assembly work.

Third Embodiment

Figure 5:
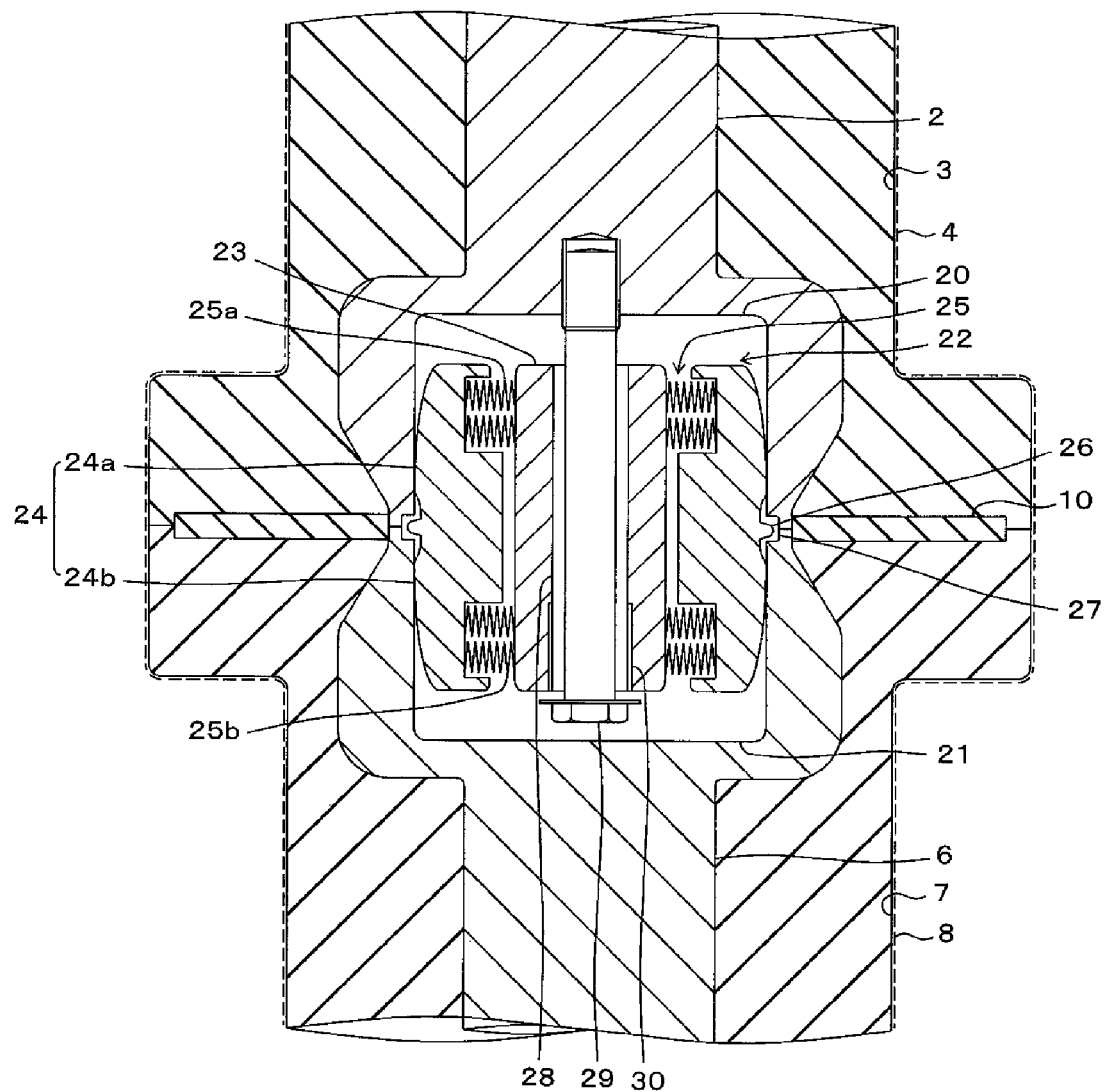
FIG. 5 is a cross-sectional view illustrating a configuration of an electrical device connector according to a third embodiment of the present invention.
Figure 6:
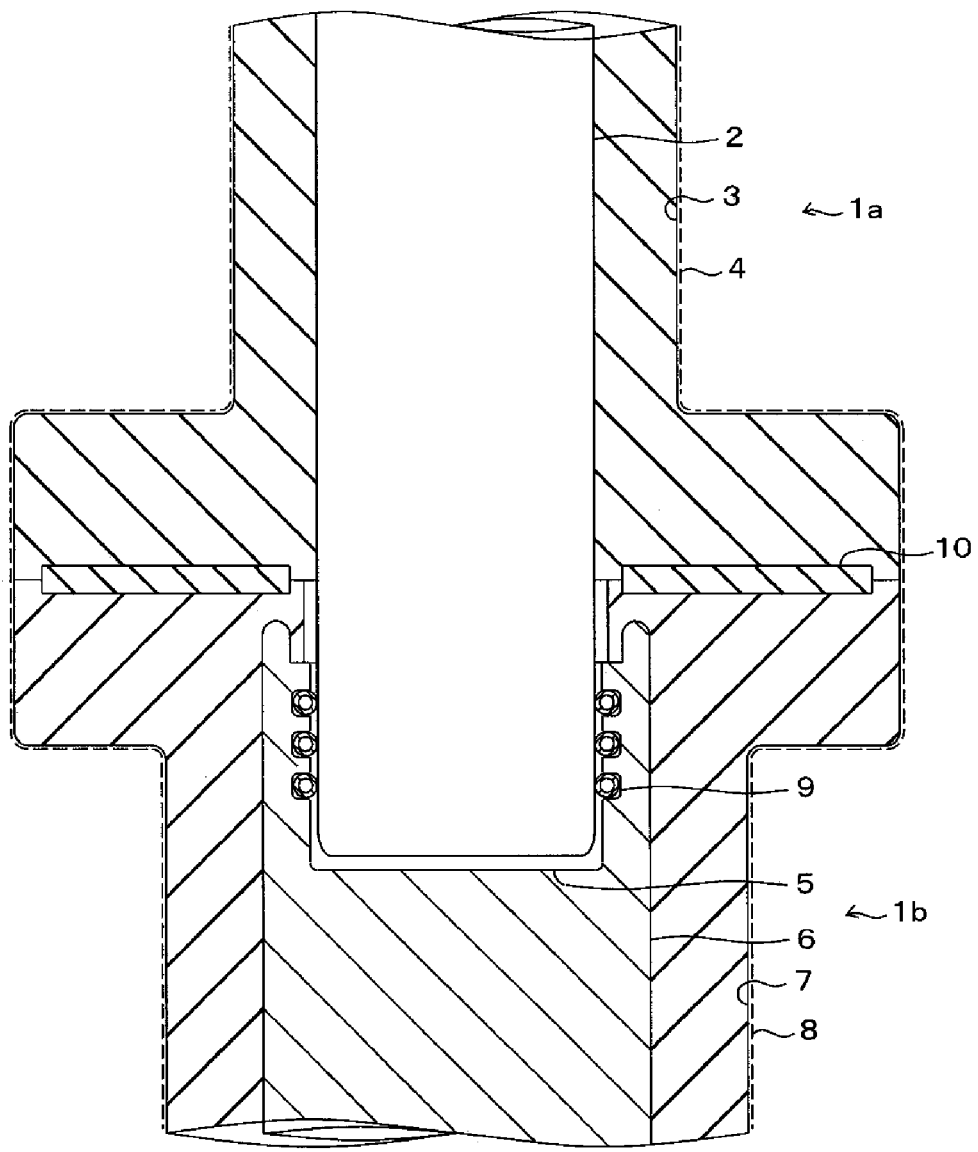
FIG. 6 is a cross-sectional view illustrating a configuration of an electrical device connector according to the related art.

Next, an electrical device connector according to a third embodiment of the present invention will be described with reference to FIG. 5. FIG. 5 is a cross-sectional view illustrating a configuration of the electrical device connector according to the third embodiment of the present invention. Further, the third embodiment is similar to the second embodiment except that a through-hole is provided in the center electrode. In FIG. 5, the same components as in the second embodiment will be denoted by the same reference numerals and the detailed description thereof will not be presented.

As illustrated in FIG. 5, a through-hole 28 is provided in an axial direction of a center electrode 23, a bolt 29 is penetrated into the through-hole, and a tip of the bolt 29 is screwed and fixed to the bottom of a first concave portion 20 or a second concave portion 21. An inner diameter of the through-hole 28 is set to be larger than an outer diameter of the bolt 29 and to move the center electrode 23 freely. In addition, a screw portion 30 is provided at an end of the through-hole 28.

According to the electrical device connector of the third embodiment described above, in addition to the effect of the second embodiment, the screw portion 30 is installed with a bolt (not illustrated) to convey the barrel-shaped contact 22 or can be temporarily installed with the bolt 29 to easily perform assembly work.

According to the embodiments as described above, even when the central axes of the first electrical device and the second electrical device become eccentric within a predetermined range, the central axes of the first electrical device and the second electrical device can come in contact with each other with the barrel-shaped contacts which is freely eccentric, and thus it is possible to obtain satisfactory contact properties and insulation properties.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrical device connector comprising:
   a first central conductor in which a first concave portion is provided at an end surface thereof;
   a first insulation layer provided around the first central conductor;
   a second central conductor in which a second concave portion is provided at an end surface thereof;
   a second insulation layer provided around the second central conductor;
   a flexible insulator provided between an insulation end surface of the first insulation layer and an insulation end surface of the second insulation layer; and
   a barrel-shaped contact provided in a space portion formed by the first concave portion and the second concave portion,
   wherein the barrel-shaped contact is configured to include:
   a center electrode;
   a plurality of contact pieces radially disposed on an outer periphery of the center electrode and including one contact surface coming in contact with an inner surface of the first concave portion and the other contact surface coming in contact with an inner surface of the second concave portion, across an intermediate portion as a boundary; and
   contact load springs provided between the contact piece and the center electrode.

2. The electrical device connector according to claim 1, wherein the contact load springs are provided on the one contact surface and the other contact surface, respectively, so as to face each other.

3. The electrical device connector according to claim 1 or 2, wherein the contact piece is provided with a convex portion at the intermediate portion thereof, and at least one of the first concave portion and the second concave portion is provided with a groove portion to which the convex portion is loosely fitted.

4. The electrical device connector according to claim 1 or 2, wherein the center electrode is provided with a through-hole, and the through-hole is penetrated by a bolt which is screwed to a bottom of the first concave portion or the second concave portion.

5. The electrical device connector according to claim 1 or 2, wherein the center electrode is provided with a through-hole, the through-hole is penetrated by a bolt which is screwed to a bottom of the first concave portion or the second concave portion, and the through-hole is provided with a screw portion.

* * * * *